Oct. 7, 1941.                J. VELK                2,258,270

DRIVING MECHANISM

Filed June 26, 1939

INVENTOR
Joseph Velk
BY
ATTORNEY

Patented Oct. 7, 1941

2,258,270

UNITED STATES PATENT OFFICE 2,258,270

DRIVING MECHANISM

Joseph Velk, Milwaukee, Wis.

Application June 26, 1939, Serial No. 281,192

1 Claim. (Cl. 74—242.13)

This invention appertains to driving mechanism for power machinery, such as lathes, shapers, and the like.

In machine shops, it has been customary to drive the lathes and other machines by belts driven from an overhead line shaft. Much difficulty has been experienced with this type of drive, and the belts cause many accidents. Of late years, each lathe, shaper, or the like has been driven by an electric motor built directly in the machine. However, as lathes and like machinery are extremely expensive, most persons cannot afford to junk good running machines in order to modernize the shop.

It is, therefore, one of the primary objects of my invention to provide a novel attachment which can be readily connected with existing lathes, shapers, or the like, and effectively drive such machine without the employance of the overhead line shaft and belts.

Another salient object of my invention is the provision of a supporting post adapted to be rigidly clamped to the frame of the lathe or like machine, having adjustably mounted thereon a platform for supporting an electric drive motor and drive pulley wheels of different diameters operating the ordinary pulley wheels on the lathe or like machine.

A further important object of my invention is the provision of a novel clutch associated with the adjustable platform for operatively connecting the pulley wheels to the shaft driven by the electric motor, whereby the lathe or other machinery can be conveniently and accurately controlled by the operator.

With these and other objects in view, the invention consists in the novel construction, arrangement, and formation of parts, as will be hereinafter more specifically described, claimed, and illustrated in the accompanying drawing, in which drawing:

Referring to the drawing in detail, wherein similar reference characters designate corresponding parts through the several views, the letter L generally indicates a lathe, and A my novel driving attachment for the lathe.

Figure 1:
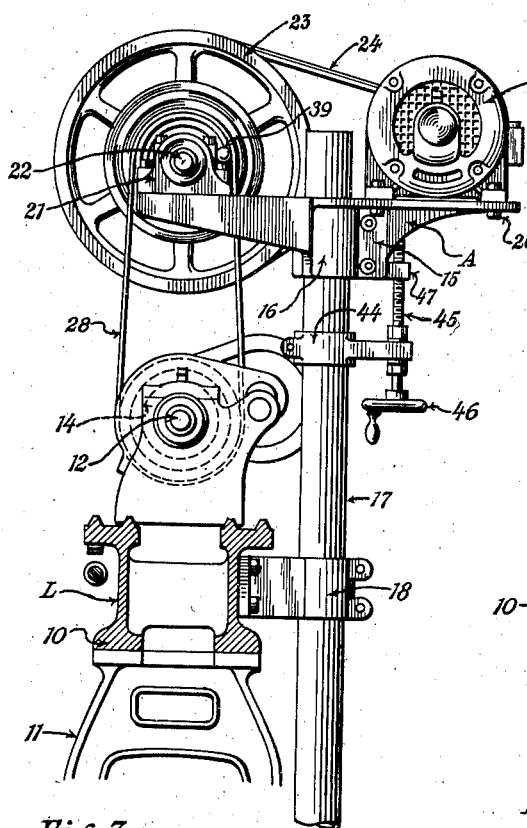
Figure 1 is a vertical, transverse, sectional view through a lathe, showing my improved attachment incorporated therewith.
Figure 2:
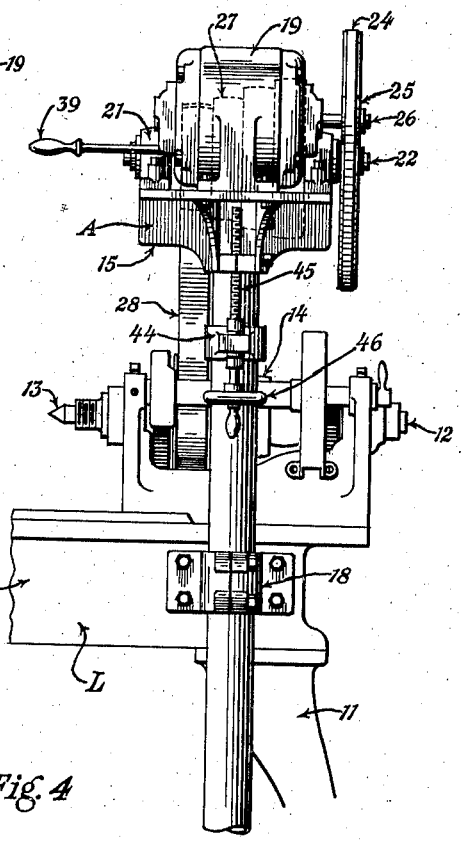
Figure 2 is a fragmentary, side, elevational view of a lathe, showing my attachment operatively connected thereto.
Figure 3:
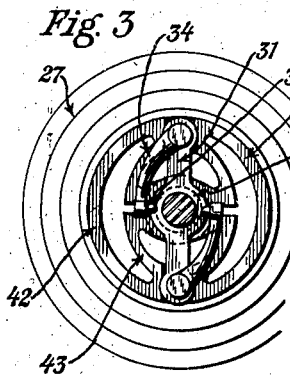
Figure 3 is a sectional view through the drive shaft operated from the electric motor, showing the novel clutch utilized for connecting the pulleys with the drive shaft.
Figure 4:
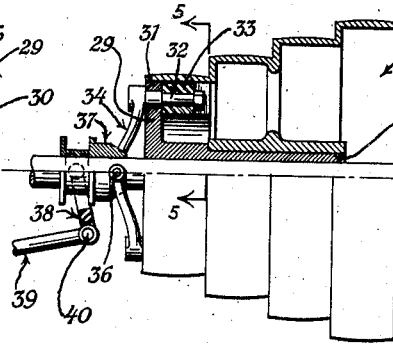
Figure 4 is a fragmentary, detail, sectional view, illustrating the clutch for connecting the different sized pulleys with the drive shaft.
Figure 5:
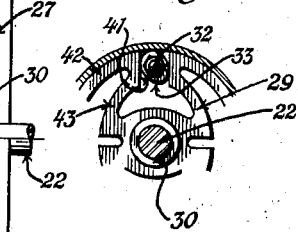
Figure 5 is a detail sectional view taken on the line 5—5 of Figure 4, looking in the direction of the arrows.

The lathe L can be considered as being of the customary type now employed in machine shops and driven by a belt from an overhead line shaft.

While I have shown my attachment A incorporated with a lathe, it is to be understood that the lathe has been shown to illustrate only one use of my invention, and, hence, the attachment can be associated with other machinery, such as shapers, drill presses, etc.

As shown, the lathe L includes the usual frame or bed 10 supported upon legs or standards 11. One end of the frame or bed 10 rotatably supports the shaft 12 for the centering point 13. The shaft 12 has keyed or otherwise secured thereto a series of different sized pulleys 14. The lathe includes other standard features, and as the invention resides in the attachment A, and not in the lathe, no further description of the lathe will be given.

My attachment A comprises a platform 15, including a centrally disposed sleeve 16. This sleeve is slidably mounted on a vertical post 17. In accordance with my invention, the post 17 is rigidly secured to the lathe or other machine with which it is associated, and the post extends, preferably, to the ground or floor of the shop. Rigidly bolted to the bed or frame 10 of the lathe L is a clamp 18, and this clamp 18 firmly holds the post 17 in place.

Firmly connected to the platform 16 on one side of the post 17 is an electric motor 19 of the desired rating. If preferred, the motor can be adjustably mounted on the platform so that the same can be moved back and forth. This can be easily accomplished by forming slots in the platform through which the bolts 20 for the motor extend. On the other side of the post 17 from the motor 19 is mounted bearings 21 in which is rotatably mounted a drive shaft 22. This drive shaft 22 has keyed or otherwise secured thereto a relatively large pulley wheel 23. This pulley wheel 23 is connected by means of a belt 24 with a pulley wheel 25, which is keyed or otherwise secured to the armature shaft 26 of the motor 19.

Rotatably mounted upon the shaft 22 is a series of different sized connected pulleys 27, and these pulleys are positioned, preferably, directly above the series of different sized pulleys 14, which are secured to the shaft 12 of the lathe. The set of pulleys 27 is adapted to be connected to the set of pulleys 14 by a shiftable pulley belt 28.

The set of pulleys 27 can be connected, at the will of the operator, with the drive shaft 22 by means of my novel clutch 29, which will now be described.

The clutch 29 includes an elongated hub 30 keyed or otherwise secured to the shaft 22, and, if preferred, the set of pulleys 27 can be rotatably mounted upon this hub. One end of the hub has formed thereon radially extending arms 31, and these arms, in turn, rotatably support stub shafts 32. Rigidly secured to the stub shafts 32 are spreading cams 33, which will be hereinafter more fully described. The ends of the stub shafts 32, which are remote from the cams 33, have secured thereto crank-arms 34, and these crank-arms 34 have their inner ends provided with pins or the like 35, which ride on a shiftable cone 37. The cone 37 can be feathered on the shaft 22, if so desired, and is shifted back and forth for rotating the shafts 32 by means of a yoke 38, which extends angularly from the inner end of the operating lever 39. The lever 39 is rockably mounted at its angle on a pivot pin 40, which is connected to the platform 15 of the attachment A.

The cams 33 are disposed between adjacent faces 41 of clutch shoes 42. These clutch shoes are of a semicircular shape and are formed on the common hub 30 and are arranged within one of the pulley wheels of the set of pulley wheels 27.

When the shafts 32 are actuated, the cams 33 tend to spread the clutch shoes 42 against the inherent resiliency of the arms 43, which connect said shoes to said common hub 30. Obviously, by swinging the lever 39 back and forth, the clutch 29 will be operated for connecting the set of pulleys 27 with the shaft 22.

The platform 15 can be raised or lowered on the post 17 in any preferred way, and, as illustrated, a collar 44 is rigidly secured on the post, and this collar has rotatably mounted thereon a feed screw 45, which can be turned by a hand wheel 46. The screw 45 extends through a feed nut 47 carried by the platform, and, hence, upon the turning of the feed screw, the platform can be adjusted.

From the foregoing description it can be seen that I have provided an exceptionally simple and novel means for operatively connecting an electric motor drive unit with a lathe or similar machine for permitting the effective operation of the machine from said motor.

Changes in details may be made without departing from the spirit or the scope of my invention, but what I claim as new is:

The combination with a machine including a frame and an operating shaft, of a power-drive attachment for actuating the machine and shaft, including a single upright supporting post, means rigidly securing the post to the frame of the machine in a vertical position, a platform having a guide sleeve formed thereon intermediate its ends slidably mounted on the post with the platform partially extending over the machine, means for raising and lowering the platform and for holding the platform in a selected adjusted position including a feed screw rotatably supported on the post, means for turning the screw, and a feed nut carried by the platform receiving the feed screw, an electric motor mounted upon the platform on one side of the post, a drive shaft rotatably mounted on the platform on the other side of the post, means operatively connecting the drive shaft to the motor, and means operatively connecting the drive shaft of the attachment with the operating shaft of the machine.

JOSEPH VELK.